July 18, 1950 G. C. DRAPER 2,515,200
ATTITUDE INDICATING INSTRUMENT
Filed Jan. 27, 1949 2 Sheets-Sheet 1
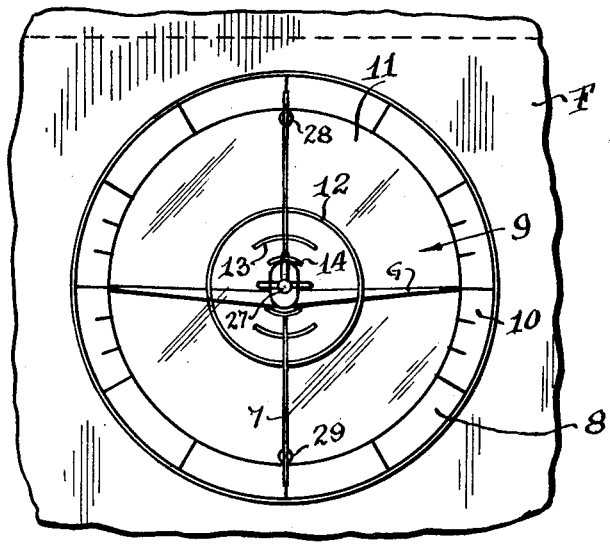
Fig_1
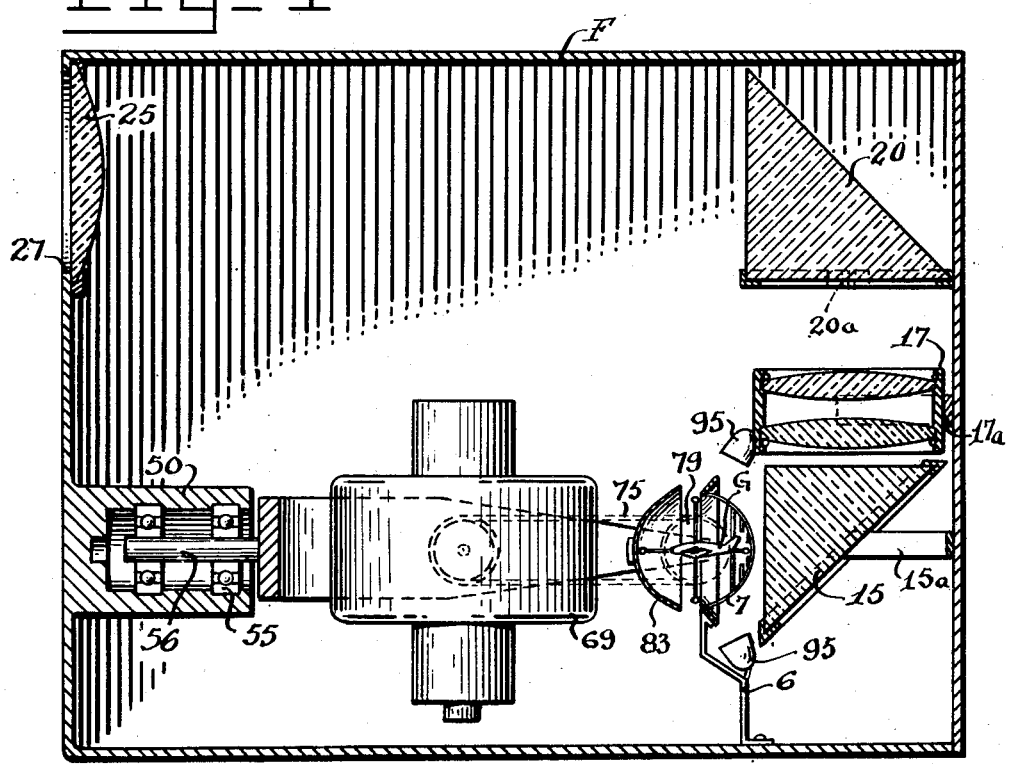
Fig_2
Inventor
George C. Draper
By Alan Smabey
Attorney

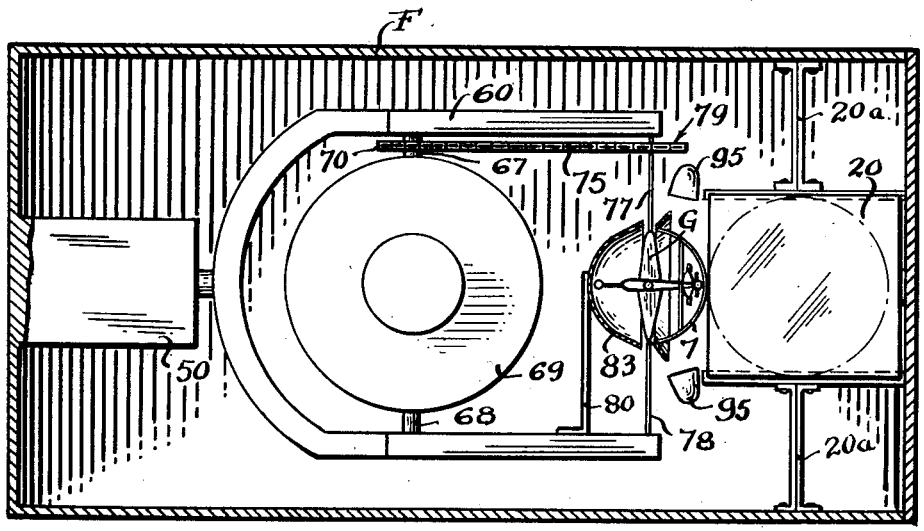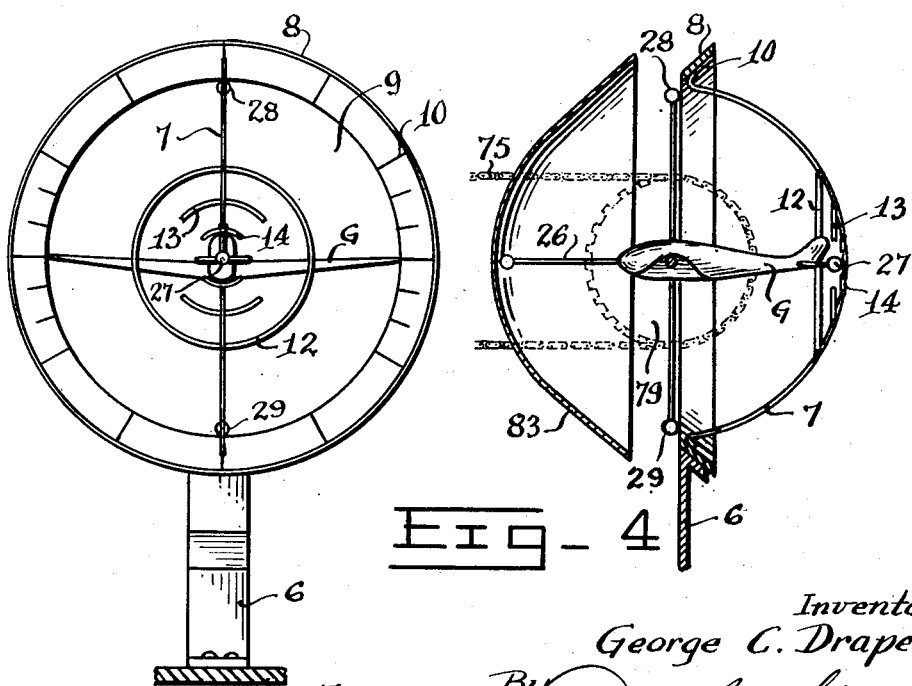

Patented July 18, 1950

2,515,200

UNITED STATES PATENT OFFICE 2,515,200

ATTITUDE INDICATING INSTRUMENT

George C. Draper, Rosemere, Quebec, Canada

Application January 27, 1949, Serial No. 73,140

7 Claims. (Cl. 33—204)

Introduction

This invention relates to instruments for indicating the attitude of a craft or vehicle in relation to a reference plane. More specifically, the invention relates to an attitude indicator for aircraft to enable the pilot to determine the attitude of his aircraft relative to the horizontal plane.

The prior art

The type of instrument in current general use for this purpose is based on the principle of indicating to the pilot the relative position of his aircraft to a horizon line which, within limits, remains horizontal. The disadvantage in this type of instrument is, that, although the horizon line remains horizontal and it is the aircraft including its other instruments which actually moves, the impression given to the pilot is that the horizon line moves. This apparent movement is in a direction opposite to the actual movement of the aircraft, so that the natural reaction of the pilot is to apply the opposite corrective movement to the controls. Correct interpretation requires mental effort on the part of the pilot and to the less experienced this can cause dangerous confusion and has resulted in many accidents.

Other instruments have been suggested which aim to overcome, to a certain extent, the difficulty described but they have shortcomings in other respects. For instance, in some the movement of the indicating device is limited, and, in others the mechanism actuating the moving parts is, for practical purposes, insufficiently accurate, too cumbersome, or inoperative.

The invention

The applicant has invented an attitude indicating device which overcomes the above-mentioned disadvantages of prior devices, and provides certain positive advantages. This device includes an indicator, preferably a three dimensional replica of a craft such as that in which it is to be used. The indicator is mounted, actuated and related to an optical system, so that the indicator assumes an attitude in relation to the longitudinal and transverse axes of the craft, which when conveyed to the pilot by the optical system corresponds with relation to reference indicia to the actual attitude of the craft in relation to the horizontal plane. For example, if the aircraft lowers a wing, the indicator appears to the pilot to do likewise; if the craft noses down, the indicator appears to do likewise, and so on.

More specifically, the indicator is mounted for movement about horizontal axes, longitudinal and transverse relative to the mounting and the indicator is connected to gyroscopic means which actually causes the indicator to remain parallel to the horizontal plane and consequently to move relative to reference indicia within the device.

The invention will be better understood by reference to the accompanying drawings which illustrate the preferred embodiment of it and in which:

Figure 1 is a front elevation of the instrument as viewed by the pilot.

Figure 2 is a vertical side elevation partially in section of the instrument.

Figure 3 is a plan view partially in section corresponding to Figure 2.

Figure 4 is an enlarged vertical cross section of the indicator and associated parts as shown in Figure 2.

Figure 5 is a rear elevation of the indicator.

Detailed description

Referring to the drawings, the device includes a casing F which is mounted in the aircraft so that it has longitudinal and lateral axes which register with those of the aircraft. The first axis is that about which the aircraft banks, and the second is that about which it dives and climbs. The casing F includes a projection or housing 50 in which are mounted bearings 55. The bearings 55 journal a shaft 56 in which is mounted a bifurcated gimbal ring 60 to support a gyroscope. The ring 60 includes bearings (not shown) for the shafts or trunnions 67 and 68 of an inner gimbal ring 69 to carry the gyroscope. The shaft 67 carries a sprocket 70. The gimbal ring 60 also journals two shafts 77 and 78 which extend outwards from the wing tips of a facsimile aircraft G serving as an indicator. This indicator is mounted in such a way that it is normally in right-side up position with respect to the aircraft, but its tail faces the nose of the aircraft. The shaft 77 carries a sprocket 79. A sprocket chain 75 connects the sprockets 70 and 79 so that any movement between the outer gimbal ring 60 and the inner gimbal 69, as may be caused by the action of the gyroscope when the aircraft adopts an attitude varying from the horizontal, is transmitted to the indicator G.

Lights 95 illuminate the indicator. A bracket 80 which extends inward from one arm of the ring 60 carries a concave shield 83 or background against which the indicator is viewed.

In front of the facsimile or indicator G is a bracket 6 which supports an annular dial 8. The dial 8 is marked with radially arranged graduations 10 about its inner surface, as shown in Figure 5, and it frames an opening 9 through which the indicator G is seen. Extending vertically across the dial 8 and spanning the opening 9 is a support 7 having a semi-circular form and attached concentrically of this support in staggered relationship is an indicating ring 12 and indicating ring portions 13 and 14. The ring 12 and portions 13 and 14 and the support 7 are preferably made of wire of a sufficiently fine gauge so that they will not block the view of the indicator but will appear as circular and semi-circular graduations with the support 7 appearing as a vertical indicating line when the indicator G is viewed through the lens 25.

The indicator G also includes pointers 26 and 27 extending from the nose and tail of the replica and pointers 28 and 29 extending above and below the body of the replica respectively and these together with the indicating ring 12 and indicator ring portions 13 and 14 combine to give the pilot the degree in which the aircraft is climbing or diving. Similarly, the wing tips of the replica together with the radially arranged graduations 10 combine to give the pilot the degree in which the aircraft is banking.

The optical system of the instrument includes a right angle prism 15 mounted on a bracket 15a and positioned directly in front of, and in register with the opening 9 in the dial 8. Mounted above the prism 15 and supported in a mounting 17a attached to the casing F is a double lens 17. A second right angle prism 20 is mounted on a bracket 20a attached to the casing F above the double lens 17 and so reflects the image of the facsimile indicator G toward the viewing lens 25 which is mounted in an opening 27 in the casing F.

*Operation*

The operation of the attitude indicator is as follows. The instrument casing is fixed in the aircraft and is carefully placed so that the longitudinal and lateral axes of the casing are positioned relative to the longitudinal and lateral axes of the aircraft. The gyroscope in the inner gimbal ring 69 is arranged to maintain its spinning axis vertical relative to the horizontal plane.

When the aircraft banks the outer gimbal ring 60 being rotatably mounted on the shaft 56 is maintained on the horizontal plane by the action of the gyroscope. As the indicator G is mounted between the arms of the outer gimbal ring 60 it also is maintained in a horizontal plane while the casing is tilted. By viewing the indicator through the lens 25 it is thus possible, by the relative positions of the indicator wings and the graduations 10 surrounding the dial 8 to tell at a glance the degree of tilt and the direction in which the aircraft is tilted or banked.

When the aircraft is tilted, nose up or nose down, the inner gimbal ring 69, being mounted for pivotal movement within the outer gimbal ring 60, is maintained in a horizontal position through the action of the gyroscope while the casing is tilted up or down in a longitudinal direction.

This movement between the outer 60 and inner 69 gimbal rings is transmitted through the sprockets 70, 79, and chain 75 to the indicator G so that the indicator is maintained on a horizontal plane while the casing is tilted.

The pilot sees the image of the indicator G through the lens 25 and so can easily determine whether or not the plane is level, or if climbing or diving can determine the angle at which the aircraft is inclined. This arrangement provides a distinct advantage over the prior instruments of this nature in that the indicator is shown relative to graduated scales in exactly the same position that the aircraft occupies relative to the ground. For example, when the aircraft banks, say by dipping its right wing, the indicator stays horizontal, so that relative to the mounting it will dip its right wing (looking from rear to nose of the indicator), and will be seen in the viewing lens to dip its right wing. When the aircraft banks by dipping its left wing, the indicator will likewise be seen in the viewing lens as dipping its left wing.

When the aircraft lowers its nose, the indicator stays horizontal, i. e., it will lower its nose with respect to the mounting. When the aircraft raises its nose, the facsimile will do likewise.

Likewise, all the other movements of the indicator relative to the casing as viewed through the lens 25 (actually it is the casing which is moving while the indicator is kept horizontal by the gyroscope) simulate the movements of the aircraft relative to the ground.

It will be understood that variations may be made in the optical system shown. For example, the viewing lens 25 may be tilted and likewise the prisms 15 and 20 so that the instrument may be placed below the eye level of the pilot. It may also be desirable to change the position of the double lens and put it, for example, between the viewing lens 25 and the prism 20. Mirrors may take the place of the prisms 20 and 15.

It is also contemplated that the sprockets 70 and 79 and the chain 75 could be replaced by gear wheels, one surrounding the inner gimbal ring 69 and one surrounding the indicator G with suitable idler gears between. This alternative construction would of course, necessitate a modification of the concave shield 83 and its supporting bracket 80.

Other modifications of the specific construction shown may be made within the spirit of the invention.

This application is a continuation-in-part of application Serial No. 578,533, filed February 17, 1945.

I claim:

1. An attitude indicator for craft comprising, a casing adapted to be held in fixed position in the craft, locating indicia within the casing, an indicator being the facsimile of a craft, the indicator being mounted out of the normal and direct line of sight of the pilot of the craft, the indicator being mounted for rotational movement relative to said indicia and facing a direction opposite to the craft, gyroscopic means controlling the attitude of the indicator to cause it to maintain a position parallel to the horizontal, viewing means adapted to be placed in line of sight of the pilot, optical means for translating the movements of the indicator and for conveying them to said viewing means so that the movements of the indicator relative to the indicia appear in the same sense as those of the aircraft relative to the ground.

2. An attitude indicator for aircraft, comprising, a casing, an indicator being the facsimile of a small aircraft, said indicator being within the casing out of direct line of sight of the pilot, and mounted for rotational movement about horizontal axes longitudinal and transverse in respect of said casing and facing in a direction opposite to that of the aircraft and right-side up with respect thereto, gyroscopic means for causing said indicator to maintain a position parallel to the horizontal, a viewing lens within said casing and adapted to be placed in a line of vision of the pilot, optical means for reflecting the movements of said facsimile and for optically transmitting said reflection to said viewing lens, whereby the facsimile appears to the pilot to be facing in the same direction as the aircraft and right-side up.

3. A device, according to claim 2, including a gimbal fork mounted for rotation in said casing about the longitudinal axis of the aircraft in flight, the facsimile being mounted between the prongs of said fork for rotational movement in respect thereto about the transverse axis of the aircraft, a gyroscope mounted in said gimbal fork adapted to retain said fork in a horizontal position in respect of the longitudinal axis of the aircraft, and means connecting said gyroscopic means and said facsimile whereby the gyroscope is adapted to retain said facsimile in horizontal postion in respect to the horizontal plane.

4. A device, according to claim 3, wherein the gyroscope includes a spindle by which it is mounted in the fork, the facsimile includes a spindle by which it is mounted in the fork, a sprocket is mounted on each spindle and a chain connects the sprockets.

5. A device, according to claim 2, wherein said optical means includes a prism in front of said facsimile, a double lens above the prism, a prism above the double lens and said viewing lens is in line with said last-mentioned prism whereby the image of the facsimile is picked up by the first-mentioned prism, passes through said double lens and is picked up by said second-mentioned prism and thus transmitted to said viewing lens.

6. A device, according to claim 2, wherein the facsimile includes indicating pins extending forward, rearward, upward and downward therefrom, an annular dial mounted between said facsimile and said optical means, a radial scale on said dial adapted to indicate the movements of the facsimile in bank and concentrically arranged indicia for indicating the movements of the facsimile in pitch.

7. A device, according to claim 5, wherein there is a substantially circular convex field member mounted in fixed relationship to the casing behind said facsimile.

GEORGE C. DRAPER.

No references cited.